United States Patent [19]

Duffy et al.

[11] Patent Number: 5,689,395

[45] Date of Patent: Nov. 18, 1997

[54] OVERCURRENT PROTECTION CIRCUIT

[75] Inventors: Hugh Duffy, Cupertino; Craig Wynn, Palo Alto; St. Elmo Nickols, III, Los Gatos; Brian Thomas, San Francisco, all of Calif.

[73] Assignee: Raychem Corporation, Menlo Park, Calif.

[21] Appl. No.: 564,831

[22] Filed: Nov. 29, 1995

Related U.S. Application Data

[60] Provisional application No. 60/003,732, Sep. 14, 1995.

[51] Int. Cl.[6] .................................................. H02H 3/00
[52] U.S. Cl. ........................ 361/93; 361/103; 361/106; 361/115
[58] Field of Search ............................. 361/93, 115, 103, 361/106; 219/502

[56] References Cited

U.S. PATENT DOCUMENTS

| 3,241,026 | 3/1966 | Andrich | 318/442 |
|---|---|---|---|
| 3,249,810 | 5/1966 | Strom et al. | 317/11 |
| 3,488,761 | 1/1970 | Ito et al. | 337/221 |
| 4,070,641 | 1/1978 | Khalid | 338/61 |
| 4,071,836 | 1/1978 | Cook et al. | 335/195 |
| 4,237,441 | 12/1980 | van Konynenburg et al. | 338/22 |
| 4,238,812 | 12/1980 | Middleman et al. | 361/106 |
| 4,315,237 | 2/1982 | Middleman et al. | 338/22 R |
| 4,317,027 | 2/1982 | Middleman et al. | 219/553 |
| 4,426,633 | 1/1984 | Taylor | 338/25 |
| 4,445,079 | 4/1984 | DeFilippis et al. | 318/792 |
| 4,485,283 | 11/1984 | Hurtle | 200/144 R |
| 4,545,926 | 10/1985 | Fouts et al. | 252/511 |
| 4,583,146 | 4/1986 | Howell | 361/13 |
| 4,689,475 | 8/1987 | Kleiner et al. | 219/553 |
| 4,724,417 | 2/1988 | Au et al. | 338/22 R |
| 4,724,504 | 2/1988 | Prouty | 361/165 |
| 4,774,024 | 9/1988 | Deep et al. | 252/511 |
| 4,780,598 | 10/1988 | Fahey et al. | 219/511 |

(List continued on next page.)

FOREIGN PATENT DOCUMENTS

| 872089 | 3/1979 | Belgium | H01H 71/24 |
|---|---|---|---|
| 2019925 | 12/1990 | Canada | H01H 50/14 |
| 0424283 | 4/1991 | European Pat. Off. | H01H 47/00 |
| 2653593 | 4/1991 | France | H01H 51/08 |
| 2 258 975 | 6/1974 | Germany | H02H 7/20 |
| 2928786 | 5/1981 | Germany | H02H 3/08 |
| 59-46730 | 3/1984 | Japan | H01H 50/44 |
| 59-49127 | 3/1984 | Japan | H01H 73/36 |
| 61-22719 | 1/1986 | Japan | H02H 3/09 |
| 61-22720 | 1/1986 | Japan | H02H 3/09 |

(List continued on next page.)

*Primary Examiner*—Jeffrey A. Gaffin
*Assistant Examiner*—Stephen Jackson
*Attorney, Agent, or Firm*—Herbert G. Burkard; Bruce M. Bertram; Timothy H.P. Richardson

[57] ABSTRACT

An overcurrent protection system which will give a rapid response to relatively small overcurrents. The system, which can be connected between an electrical power supply and an electrical load to form an operating circuit, and which when so connected protects the circuit from overcurrents, has a normal operating condition and a fault condition, and comprises: a circuit interruption element having, (1) a normal state which permits the flow of a normal current, $I_{NORMAL}$, when the system is in the normal operating condition, and (2) a fault state which permits the flow of at most a reduced current, substantially less than $I_{NORMAL}$, when the system is in the fault condition; and a control element, connected in series with the circuit interruption element, the control element having a variable resistance which (1) is low when the current in the system does not exceed the normal current, $I_{NORMAL}$, by a predetermined current amount, and (2) increases by at least a predetermined resistance amount when the current in the system exceeds the normal current, $I_{NORMAL}$, by the predetermined current amount; the circuit interruption element changing from its normal state to its fault state, thereby causing the system to change from its normal operating condition to its fault condition, when the resistance of the control element has increased by the predetermined resistance amount.

19 Claims, 4 Drawing Sheets

U.S. PATENT DOCUMENTS

| | | | |
|---|---|---|---|
| 4,800,253 | 1/1989 | Kleiner et al. | 219/553 |
| 4,808,965 | 2/1989 | Cenky | 337/408 |
| 4,816,958 | 3/1989 | Beibel et al. | 361/93 |
| 4,845,838 | 7/1989 | Jacobs et al. | 29/671 |
| 4,857,880 | 8/1989 | Au et al. | 338/22 R |
| 4,859,836 | 8/1989 | Lunk et al. | 219/548 |
| 4,901,186 | 2/1990 | Tennant et al. | 361/106 |
| 4,907,340 | 3/1990 | Fang et al. | 29/610.1 |
| 4,910,631 | 3/1990 | Murphy | 361/96 |
| 4,924,074 | 5/1990 | Fang et al. | 219/548 |
| 4,935,156 | 6/1990 | van Konynenburg et al. | 219/553 |
| 4,967,176 | 10/1990 | Horsma et al. | 338/22 R |
| 5,049,850 | 9/1991 | Evans | 338/22 R |
| 5,089,801 | 2/1992 | Chan et al. | 338/22 R |
| 5,254,816 | 10/1993 | Shutoh et al. | 200/144 |
| 5,378,407 | 1/1995 | Chandler et al. | 252/513 |
| 5,428,195 | 6/1995 | Arnold | 218/1 |
| 5,493,101 | 2/1996 | Innes | 219/502 |

FOREIGN PATENT DOCUMENTS

| | | | |
|---|---|---|---|
| 4-351825 | 12/1992 | Japan | H01H 33/59 |
| 5-6720 | 1/1993 | Japan | H01H 9/54 |
| 5-6723 | 1/1993 | Japan | H01H 33/59 |
| 5-6725 | 1/1993 | Japan | H01H 33/95 |
| 2 055 264 A | 2/1981 | United Kingdom | H02H 3/08 |
| 1172718 | 1/1988 | United Kingdom | H02H 3/08 |
| WO 91/12643 | 8/1991 | WIPO | H02H 3/093 |
| WO 93/07667 | 4/1993 | WIPO | H02H 3/08 |

OVERCURRENT PROTECTION CIRCUIT

RELATED APPLICATIONS

This application is an application under 37 USC 111(a) and claims priority under 35 USC 119(e) from Provisional Application Serial No. 60/003,732, filed Sep. 14, 1995 under 35 USC 111(b).

This application is related to copending, commonly assigned provisional application Ser. No. 60/003,733, filed Sep. 14, 1995 under 35 USC 111(b), copending, commonly assigned provisional application Ser. No. 60/003,731, filed Sep. 14, 1995 under 35 USC 111(b), and copending, commonly assigned provisional application Ser. No. 60/003,743, filed Sep. 14, 1995 under 35 USC 111(b), the disclosures of which are incorporated herein by reference for all purposes.

This application is related to copending, commonly assigned U.S. patent application Ser. No. 08/564,465, copending commonly assigned U.S. patent application Ser. No. 08/564,457, and copending commonly assigned U.S. patent application Ser. No. 08/567,495 which are being filed on the same day as this application, the disclosures of which are incorporated herein by reference for all purposes.

BACKGROUND OF THE INVENTION

1. Field of the Invention

This invention relates to electrical circuit overcurrent protection.

2. Introduction to the Invention

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

A limitation on the known uses of PTC protection devices is that if the overcurrent is relatively small, e.g. up to a few times the normal circuit current, it can take a relatively long time to convert the PTC device into its tripped state.

SUMMARY OF THE INVENTION

We have discovered a new overcurrent protection system which will give a rapid response to relatively small overcurrents. In the new system, a control element and interrupt element are placed in series with the load. The control element is functionally linked to the interrupt element, so that, when the current in the circuit exceeds a predetermined amount, the control element senses the overcurrent and causes the interrupt element to change from a relatively conductive state to a relatively non-conductive state (including a completely open state).

In a preferred aspect, this invention provides an electrical system which can be connected between an electrical power supply and an electrical load to form an operating circuit, and which when so connected protects the circuit from overcurrents, the system having a normal operating condition and a fault condition, and comprising:

a. a circuit interruption element having,
  (1) a normal state which permits the flow of a normal current, $I_{NORMAL}$, when the system is in the normal operating condition, and
  (2) a fault state which permits the flow of at most a reduced current, substantially less than $I_{NORMAL}$, when the system is in the fault condition; and b. a control element, connected in series with the circuit interruption element, the control element having a variable resistance which
  (1) is low when the current in the system does not exceed the normal current, $I_{NORMAL}$, by a predetermined current amount (i.e the current is at least $I_{NORMAL}$ plus the predetermined current amount), and
  (2) increases by at least a predetermined resistance amount when the current in the system exceeds the normal current, $I_{NORMAL}$, by the predetermined current amount;

and comprising a series combination of:
  (a) a current sensing means having
    (i) a current deenergized state, when the current in the system does not exceed the normal current, $I_{NORMAL}$, by the predetermined current amount, and
    (ii) a current energized state, when the current in the system has exceeded the normal current, $I_{NORMAL}$, by the predetermined current amount; and
  (b) a parallel combination of
    (i) a first circuit switch, coupled with the current sensing means, wherein the first circuit switch is
      (ia) closed when the current sensing means is in the current deenergized state, and
      (ib) open when the current sensing means is in the current energized state,
    (ii) a voltage sensing means having
      (iia) a voltage deenergized state when the voltage across the voltage sensing means does not exceed a predetermined voltage amount, and
      (iib) a voltage energized state when the voltage across the voltage sensing means exceeds the predetermined voltage amount, and
    (iii) a PTC device;

the circuit interruption element changing from its normal state to its fault state, thereby causing the system to change from its normal operating condition to its fault condition, when the resistance of the control element has increased by the predetermined resistance mount.

BRIEF DESCRIPTION OF THE DRAWINGS

The invention is illustrated in the accompanying drawings, in which like components are given the same reference numerals in each FIG. in which they appear, and in which:

FIG. 2c shows the circuit diagram of FIG. 2a with dotted lines surrounding the circuit components which respectively perform the functions depicted in the functional block diagram of FIG. 1a.

DETAILED DESCRIPTION OF THE INVENTION

Figure 1A:
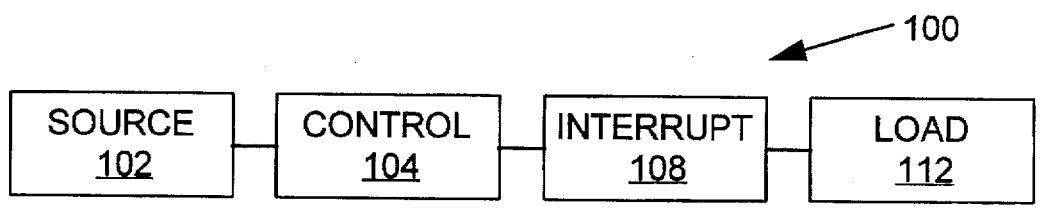
FIGS. 1a through 1e show block diagrams depicting the functions performed by the electrical components in various overcurrent protection circuits of this invention.
Figure 1B:
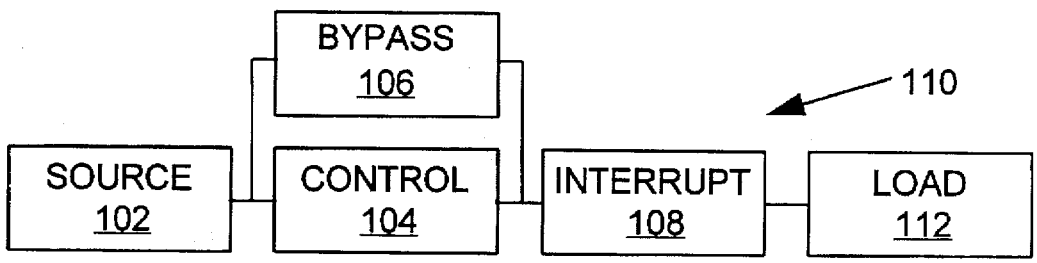
Figure 1C:
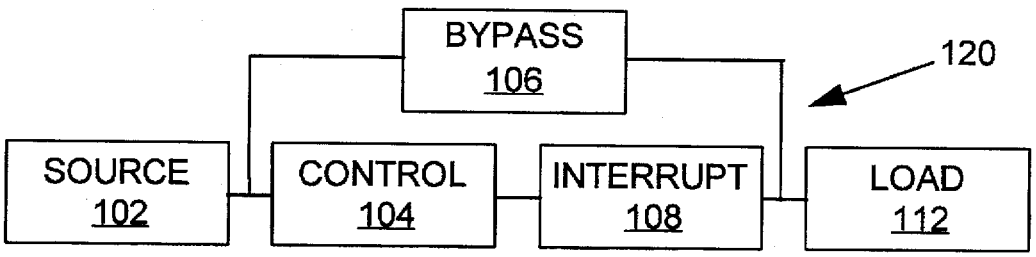

Overcurrent protection circuits arranged in accordance with the principles of this invention generally perform the four functions of sensing the current, interrupting the circuit, limiting the energy transferred to the circuit, and isolating the circuit from the power source. The overcurrent protection circuits may be viewed as comprising certain operational elements which work cooperatively to perform the four overcurrent protection functions. FIGS. 1a through 1e are block diagrams showing several arrangements of such operational elements.

Five operational elements depicted in FIGS. 1a through 1e are the source 102, control element 104, bypass element 106, interrupt element 108 and load 112. The source 102 provides the electrical power to the circuit, and the load 112 performs the intended purpose of the circuit. The control 104, bypass 106 and interrupt 108 elements work cooperatively to provide the overcurrent protection. The control element 104 typically performs the two functions of sensing the current and limiting the energy transferred to the circuit in case of overcurrent. The interrupt element 108 typically performs the functions of interrupting the current in the circuit and providing circuit isolation. The bypass element 106 typically assists the control element 104 in limiting the energy passed to the circuit by diverting current, thereby permitting the interrupt element 108 to interrupt the current in the circuit.

As represented in FIG. 1a, some overcurrent protection circuits may include control 104 and interrupt 108 elements, but no bypass element 106. In such circuits, the control element 104 typically reduces the current in the circuit thereby enabling the interrupt element 108 to interrupt the current at a reduced level. As represented in FIG. 1e, some overcurrent protection circuits may include control 104 and bypass 106 elements, but no interrupt element 108. In such circuits, the control 104 and bypass 106 elements typically reduce the current in the circuit substantially, but do not provide a circuit isolation function.

FIG. 1a shows a functional block diagram representing the operational elements comprising the electrical components in an embodiment of a first aspect of overcurrent protection circuits in accordance with this invention. The overcurrent protected circuit, referred to by the general reference character 100, includes four operational elements, i.e., the source 102, control element 104, interrupt element 108 and load 112.

The control element senses the current and determines whether the current delivered to the load 112 is within a normal acceptable range. When the control element 104 determines that the current delivered to the load 112 is excessive, the control element 104 reduces the current in the circuit. By reducing the current in the circuit, the control element 104 communicates with the interrupt element 108 causing the interrupt element 108 to further reduce or stop the flow of current delivered to the load 112. The control element 104 limits the energy transferred to the circuit in an overcurrent condition by working rapidly to sense the overcurrent and reduce the overcurrent thereby permitting the interrupt element 108 to safely interrupt the current delivered to the load 112.

In circuit arrangements corresponding to the block diagram of FIG. 1a, the cooperative operation of the control 104 and interrupt 108 elements permits the selection of electrical components with lower voltage and current ratings than would be required in other configurations. With the control element 104 in series with the interrupt element 108, both elements must have a carry current at least as high as the normal circuit current. However, the control element 104 may have a voltage rating significantly below the normal voltage of the circuit, and the interrupt element 108 may have the capability to interrupt the maximum overcurrent at low voltage, or to interrupt the normal voltage at low current, but need not be able to interrupt the maximum overcurrent at normal voltage. When an overcurrent occurs, the control element 104 reduces the current to a point where the current is below the interrupt current of the interrupt element 108, and does so in a time which is short enough not to damage the control element 104. The interrupt element 108 has the capability to withstand a voltage above that of the open circuit voltage of the circuit, and opens to protect the control element 104 from excessive voltage.

Figure 1D:
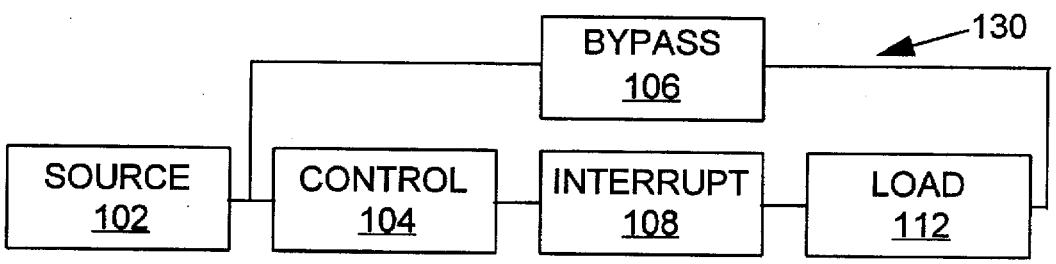
Figure 1E:
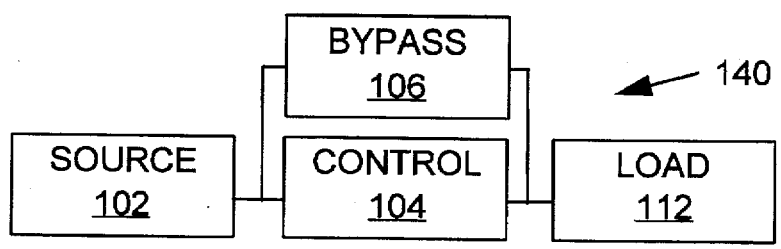

In circuit arrangements corresponding to the block diagrams of FIGS. 1a through 1d, the positions of the control 104 and interrupt 108 elements may be interchanged, i.e., the interrupt element 108 may precede the control element 104 in the circuit. However, depending on the particular configuration, the bypass element 106 would still span the control element 104 (FIG. 1b), control 104 and interrupt 108 elements (FIG. 1c), or the control element 104, interrupt element 108 and load 112 (FIG. 1d).

Figure 2A:
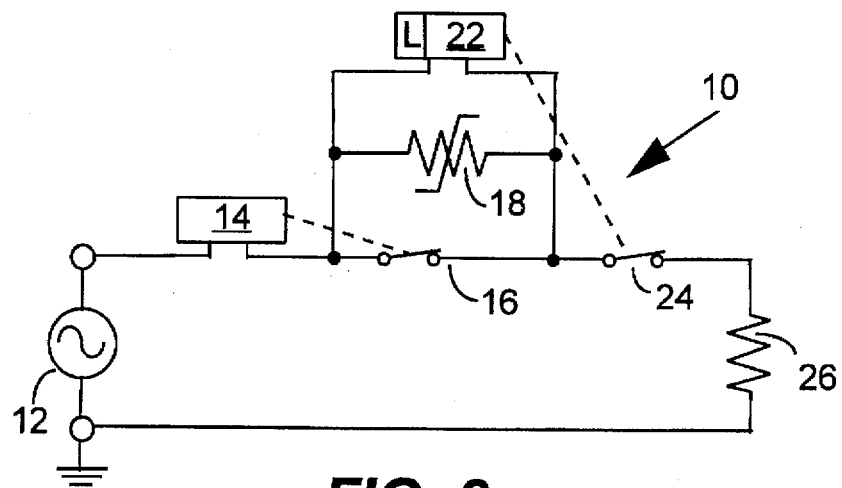
FIGS. 2a and 2b are circuit diagrams of arrangements an embodiment of a first aspect of an overcurrent protection circuit employing voltage and current sensing relays to detect overcurrents.

FIG. 2a shows an embodiment of a first aspect of an overcurrent protection circuit 10 employing a certain arrangement of a PTC device 18 with a current sensing relay 14 and a voltage sensing relay 22. The voltage sensing relay 22 is coupled to a first set of contacts 24, and the current sensing relay 14 is coupled to a second set of contacts 16. In this circuit, the current sensing relay 14 performs the function of sensing the current in the circuit 10. When the current sensing relay 14 detects an overcurrent condition, the current sensing relay 14 opens the second set of contacts 16 diverting the current to the PTC device 18. Normally the resistance of the PTC device 18 is smaller than the resistance of the voltage sensing relay 22, so most of the current flows through the PTC device 18. The PTC device 18 increases in resistance thereby limiting the current in the circuit 10, and applies a voltage across the voltage sensing relay 22. When the voltage across the voltage sensing relay 22 reaches the level necessary to energize the voltage sensing relay 22, the voltage sensing relay 22 opens the first set of contacts 24 interrupting the current in the circuit 10. The voltage sensing relay 22 is a latching relay, and after sensing and interrupting an overcurrent, would remain open until reset. The current sensing relay 14 must either be a latching relay, or must be matched with the voltage sensing relay 22 so that the current sensing relay 14 does not deenergize and close the second set of contacts 16 before the voltage sensing relay 22 completely energizes and opens the first set of contacts 24.

This arrangement has the feature that the PTC device 18 is not involved in the circuit until a fault is detected. There is therefore no requirement for the PTC device 18 to both carry current continuously and respond to a fault condition. This arrangement could therefore be used where the operating current of the circuit is greater than the hold current rating of the PTC device 18. For example, a 9.0 amp hold current PTC device 18 such as a Raychem RUE900 PolySwitch® device would normally take from 10 to 90 seconds to respond to a current of 18 amps. In the circuit arrangement of FIG. 2a, if the current sensing relay 14 were sized to respond to a current of 18 amps, a smaller PTC device 18 such as a Raychem RXE050 PolySwitch® device could be used, and would respond to an 18 amp surge in less than one second at more temperature.

Figure 2B:
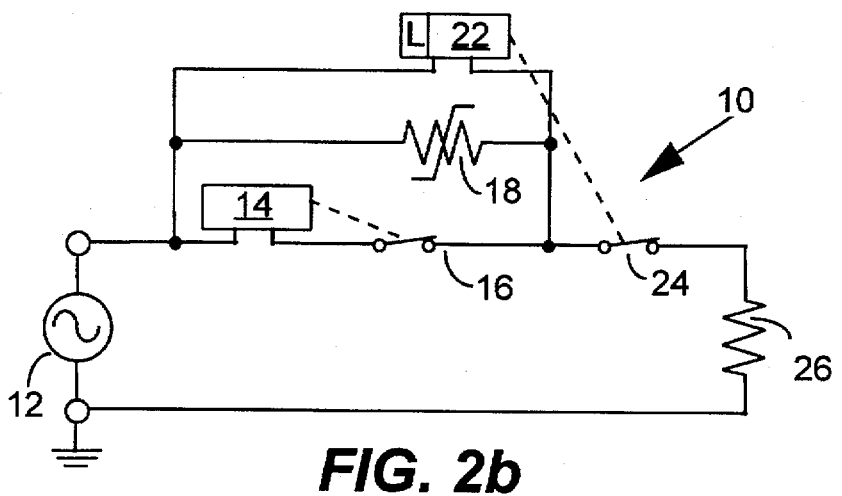

The circuit shown in FIG. 2b is the circuit of FIG. 2a with the coil of the current sensing relay 14 repositioned. In this configuration, the current sensing relay 14 must be a latching relay since current would stop flowing when the second set of contacts 16 opens.

Figure 2C:
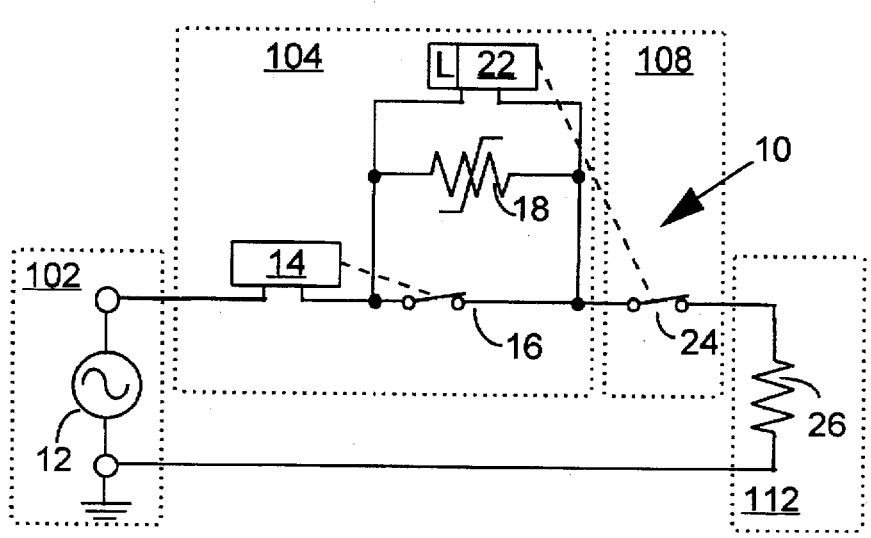

FIG. 2c shows the overcurrent protection circuit 10 of FIG. 2a with dotted lines surrounding the circuit components of the overcurrent protection circuit 10 to correspond with the four elements depicted in FIG. 1a, i.e. source 102, control element 104, interrupt element 108 and load 112.

Figure 3:
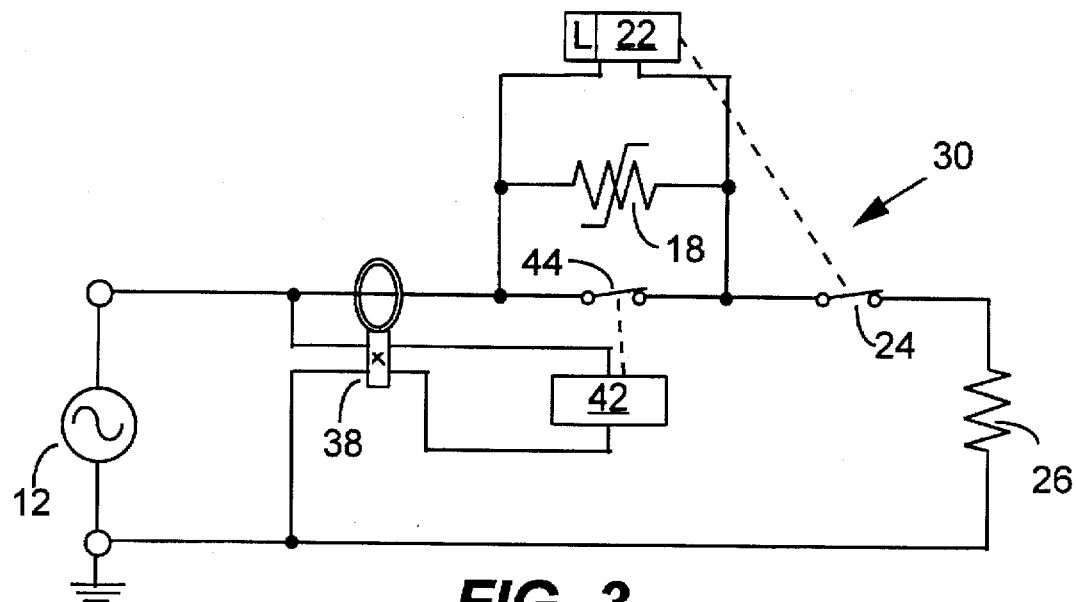
FIG. 3 is a circuit diagram of an arrangement of an embodiment of a first aspect of an overcurrent protection circuit employing a Hall effect device to detect overcurrents.

In some applications, for example cable television amplifier power supplies which operate at 1 Hz, AC current transformers used in current sensing relays would be too large to be cost effective. FIG. 3 shows an embodiment of a first aspect of an overcurrent protection circuit 30 similar to the circuit shown in FIG. 2a with the exception that a Hall effect device 38 is used to sense the current in the circuit. In this arrangement, the Hall effect device 38 monitors the current in the circuit 30, and upon sensing an overcurrent, energizes a relay 42 which opens a set of contacts 44, and diverts the current to the PTC device 18. The remainder of the operation of the circuit is as described for FIG. 2a. The Hall effect device 38 can be a linear current probe or a simple and inexpensive TTL sensor. The relay 42 and set of contacts 44 could be replaced by a transistor, a triac or other switching device.

The electrical components in the circuit shown FIG. 3 may be grouped in a manner similar to that shown in FIG. 2c with the Hall effect device 38 included in the block representing the control element 104.

Figure 4:
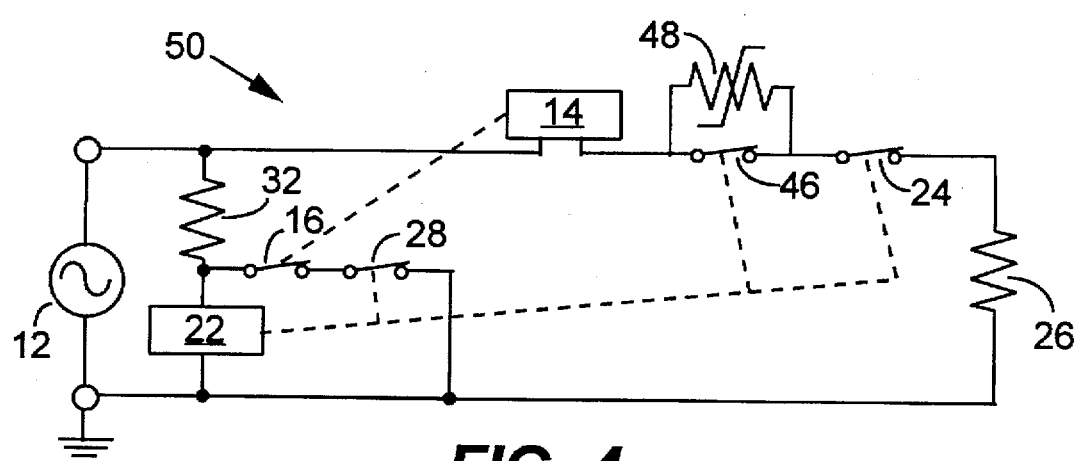
FIGS. 4 and 5 are circuit diagrams of arrangements of an embodiment of a second aspect of an overcurrent protection circuit employing current and voltage sensing relays to detect overcurrents.
Figure 5:
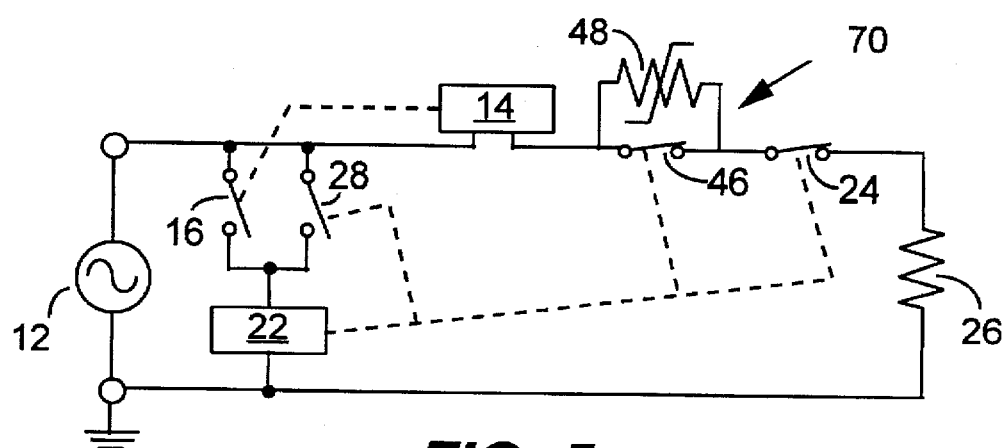

The overcurrent protection circuits depicted in FIGS. 4 and 5 are two embodiments of another aspect of the invention in which the overcurrent detection is accomplished by current sensing relays. The circuits shown in both FIGS. 4 and 5 correspond with the functional block diagram depicted in FIG. 1d. The portion of the circuits in both FIGS. 4 and 5 that would comprise the interrupt element 108 shown in FIG. 1d include the combination of the first set of contacts 24 in series with the parallel combination of the PTC device 48 and a fourth set of contacts 46. This series-parallel combination is in-and-of-itself a circuit switch, as disclosed in Provisional U.S. patent application Ser. No. 60/003,743 (docket number 1570-US 1) and U.S. patent application Ser. No. (docket number MP 1570-US2).

In the overcurrent protection circuit shown in FIG. 4, a current sensing relay 14 senses the current in the circuit 50. In an overcurrent situation, the current sensing relay 14 energizes, opening a second set of contacts 16, and diverting current through a voltage sensing relay 22. As the voltage sensing relay 22 energizes, it opens a first set of contacts 24, a third set of contacts 28 and a fourth set of contacts 46. The third set of contacts 28 in series with the second set of contacts 16 serves as a drop-out contact, ensuring that the voltage sensing relay 22 fully energizes. The combination of the first set of contacts 24 in series with the parallel combination of the fourth set of contacts 46 and the PTC device 48 safely removes the current from the load 26. As the fourth set of contacts 46 and the first set of contacts 24 start to open, the opening fourth set of contacts 46 diverts the current to the PTC device 48. The opening first set of contacts 24 may start to arc, however the PTC device 48 quickly triggers to a high impedance thereby reducing the current to a value that permits the first set of contacts to interrupt the current to the load 26.

One disadvantage of the circuit shown in FIG. 4 is that there is always some current trickling through a resistor 32, thereby dissipating power and generating heat during normal circuit operation. The overcurrent protection circuit 70 shown in FIG. 5 eliminates the need for the resistor 32. In the circuit of FIG. 5, if the current sensing relay 14 detects an overcurrent the current sensing relay 14 energizes and closes a normally open second set of contacts 16 diverting current through the voltage sensing relay 22. The voltage sensing relay 22 then energizes, closing a normally open third set of contacts 28 and opening the normally closed first set of contacts 24 and fourth set of contacts 46. Closing the third set of contacts 28 serves to keep the voltage sensing relay 22 energized, and opening the first set of contacts 24 and fourth set of contacts 46 removes current from the load 26 as described above for FIG. 4.

Figure 6:
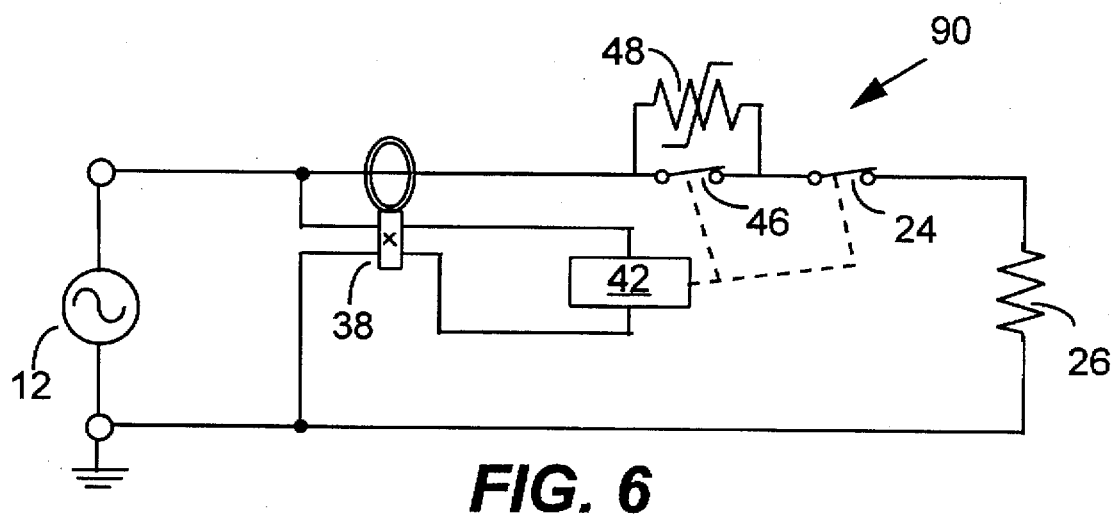
FIG. 6 is a circuit diagram of an embodiment of a third aspect of an overcurrent protection circuit employing a Hall effect device to detect overcurrents.

The overcurrent protection circuit 90 depicted in FIG. 6 is an embodiment of a third aspect of the invention employing the Hall effect device 38 to sense the overcurrent, and control the operation of relay 42 which opens both the first set of contacts 24 and the fourth set of contacts 46. In this embodiment, the opening of the first set of contacts 24 may be delayed until after the opening of the fourth set of contacts 46, depending on the time required for the PTC device 48 to switch to its high resistance state.

What is claimed is:

1. An electrical system which can be connected between an electrical power supply and an electrical load to form an operating circuit and which when so connected protects the circuit from overcurrents, the system having a normal operating condition and a fault condition, and comprising:

a. a circuit interruption element having,
  (1) a normal state which permits the flow of a normal current, $I_{NORMAL}$, when the system is in the normal operating condition, and
  (2) a fault state which permits the flow of at most a reduced current, substantially less than $I_{NORMAL}$, when the system is in the fault condition; and b. a control element, which is connected in series with the circuit interruption element, the control element having a variable resistance which
  (1) is low when the current in the system does not exceed the normal current, $I_{NORMAL}$, by a predetermined current amount, and
  (2) increases by at least a predetermined resistance amount when the current in the system exceeds the normal current $I_{NORMAL}$, by the predetermined current amount;

and comprising a series combination of:
  (a) a current sensing means having (i) a current deenergized state, when the current in the system does not exceed the normal current, $I_{NORMAL}$, by the predetermined current amount, and (ii) a current energized state, when the current in the system has exceeded the normal current, $I_{NORMAL}$, by the predetermined current amount; and (b) a parallel combination of
(i) a first circuit switch, coupled with the current sensing means, wherein the first circuit switch is
(ia) closed when the current sensing means is in the current deenergized state, and
(ib) open when the current sensing means is in the current energized state,
(ii) a voltage sensing means having
(iia) a voltage deenergized state when the voltage across the voltage sensing means does not exceed a predetermined voltage amount, and
(iib) a voltage energized state when the voltage across the voltage sensing means exceeds the predetermined voltage amount, and
(iii) a PTC device;

the circuit interruption element changing from its normal state to its fault state, thereby causing the system to change from its normal operating condition to its fault condition, when the resistance of the control element has increased by the predetermined resistance amount.

2. A system according to claim 1 wherein:
a. the current sensing means comprises a current sensing relay coil; and
b. the first circuit switch comprises a first set of contacts coupled with the current sensing relay coil.

3. A system according to claim 1 wherein:
a. the current sensing means comprises
(1) a current sensor having an output, and
(2) a relay coil coupled with the output of the current sensor; and
b. the first circuit switch comprises a first set of contacts coupled with the relay coil.

4. A system according to claim 1 wherein:
a. the circuit interruption element comprises a second circuit switch coupled with the voltage sensing means; and
b. the second circuit switch is
(1) closed when the voltage sensing means is in the voltage deenergized state, and
(2) open when the voltage sensing means is in the voltage energized state.

5. A system according to claim 4 wherein;
a. the voltage sensing means comprises a voltage sensing relay coil; and
b. the second circuit switch comprises a second set of contacts coupled with the voltage sensing relay coil.

6. An electrical system which can be connected between an electrical power supply and an electrical load to form an operating circuit, and which when so connected protects the circuit from overcurrents, the system having a normal operating condition and a fault condition, and comprising:
a. a circuit interruption element having,
(1) a normal state which permits the flow of a normal current, $I_{NORMAL}$, when the system is in the normal operating condition, and
(2) a fault state which permits the flow of at most a reduced current, substantially less than $I_{NORMAL}$, when the system is in the fault condition; and
b. a control element, which is connected in series with the circuit interruption element, the control element having a viable resistance which (1) is low when the current in the system does not exceed the normal current, $I_{NORMAL}$, by a predetermined current amount, and
(2) increases by at least a predetermined resistance amount when the current in the system exceeds the normal current, $I_{NORMAL}$, by the predetermined current amount;

and comprising a series combination of:
(a) a current sensing means, having
(i) a current deenergized state when the current in the circuit does not exceed the normal current, $I_{NORMAL}$, by the predetermined current amount, and
(ii) a current energized state when the current in the circuit has exceeded the normal current, $I_{NORMAL}$, by the predetermined current amount; and
(b) a parallel combination of
(i) a first circuit switch, coupled with the current sensing means, with the first circuit switch
(ia) closed when the current sensing means is in the current deenergized state, and
(ib) open when the current sensing means is in the current energized state, and
(ii) a PTC device;

the circuit interruption element changing from its normal state to its fault state, thereby causing the system to change from its normal operating condition to its fault condition, when the resistance of the control element has increased by the predetermined resistance amount.

7. A system according to claim 6, wherein the circuit interruption element comprises a second circuit switch coupled with the current sensing means, and wherein the second circuit switch is:
a. closed when the current sensing means is in the current deenergized state; and
b. open when the current sensing means is in the current energized state.

8. A system according to claim 7 wherein:
a. the current sensing means comprises
(1) a current sensor having an output, and
(2) a relay coil coupled with the output of the current sensor;
b. the first circuit switch comprises a first set of contacts coupled with the relay coil; and
c. the second circuit switch comprises a second set of contacts coupled with the relay coil.

9. A system according to claim 8 where the current sensor comprises a Hall effect device.

10. An electrical system which can be connected between an electrical power supply and an electrical load to form an operating circuit, and which when so connected protects the circuit from overcurrents, which system having a normal operating condition and a fault condition, and comprising:
a. a circuit interruption element having,
(1) a normal state which permits the flow of a normal current, $I_{NORMAL}$, when the system is in the normal operating condition, and
(2) a fault state which permits the flow of at most a reduced current, substantially less than $I_{NORMAL}$, when the system is in the fault condition;
b. a control element, connected in series with the circuit interruption element, and having
(1) a control element deenergized state when the current in the system does not exceed the normal current, $I_{NORMAL}$, by a predetermined current amount, and
(2) a control element energized state when the current in the circuit has exceeded the normal current, $I_{NORMAL}$, by the predetermined current amount;

c. a bypass element, connected in parallel with the series combination of
  (1) the control element,
  (2) the circuit interruption element, and
  (3) the load, and having
    (1) a bypass deenergized state which permits the flow of at most a reduced bypass current through the bypass element, and
    (2) a bypass energized state which permits the flow of a substantially increased bypass current through the bypass element; and
with the circuit interruption element changing from its normal state to its fault state when the bypass element changes from its bypass deenergized state to its bypass energized state, and the bypass element changing from its bypass deenergized state to its bypass energized state when the control element changes from its control element deenergized state to its control element energized state, thereby causing the circuit to change from its normal operating condition to its fault condition.

11. The system according to claim 10 wherein the control element comprises a current sensing means having:
  a. a current deenergized state, when the current in the system does not exceed the normal current, $I_{NORMAL}$, by the predetermined current mount; and
  b. a current energized state, when the current in the circuit has exceeded the normal current, $I_{NORMAL}$, by the predetermined current amount.

12. The system according to claim 11 wherein the bypass element comprises a series combination of:
  a. a resistor; and
  b. a parallel combination of
    (1) a voltage sensing means, having
      (a) a voltage deenergized state when the voltage across the voltage sensing means is below a predetermined voltage amount, and
      (b) a voltage energized state when the voltage across the voltage sensing means exceeds the predetermined voltage amount, and
    (2) a series combination of
      (a) a first circuit switch, coupled with the current sensing means, which is
        (i) closed when the current sensing means is in the current deenergized state, and
        (ii) open when the current sensing means is in the current energized state, and
      (b) a second circuit switch, coupled with the voltage sensing means, which is
        (i) closed when the voltage sensing means is in the voltage deenergized state, and
        (ii) open when the voltage sensing means is in the voltage energized state.

13. The system according to claim 12 wherein the circuit interruption element comprises a series combination of
  a. a third circuit switch, coupled with the voltage sensing means, which is
    (1) closed when the voltage sensing means is in the voltage deenergized state, and
    (2) open when the voltage sensing means is in the voltage energized state, and
  b. a parallel combination of
    (1) a fourth circuit switch, coupled with the voltage sensing means, which is
      (a) closed when the voltage sensing means is in the voltage deenergized state, and
      (b) open when the voltage sensing means is in the voltage energized state, and
    (2) a PTC device.

14. The system according to claim 12 wherein
  a. the current sensing means comprises a current sensing relay coil; and
  b. the first circuit switch comprises a first set of contacts coupled with the current sensing relay coil.

15. The system according to claim 12 wherein
  a. the voltage sensing means comprises a voltage sensing relay coil;
  b. the second circuit switch comprises a first set of contacts coupled with the voltage sensing relay coil; and
  c. the third circuit switch comprises a second set of contacts coupled with the voltage sensing relay coil.

16. The system according to claim 11 wherein the bypass element comprises a series combination of:
  a. a voltage sensing means having,
    (1) a voltage deenergized state when the voltage across the voltage sensing means is below a predetermined voltage amount, and
    (2) a voltage energized state when the voltage across the voltage sensing means exceeds the predetermined voltage amount; and
  b. a parallel combination of
    (1) a first circuit switch, coupled with the current sensing means, which is
      i. open when the current sensing means is in the current deenergized state, and
      ii. closed when the current sensing means is in the current energized state
    (2) a second circuit switch coupled with the voltage sensing means, which is
      i. open when the voltage sensing means is in the voltage deenergized state, and
      ii. closed when the voltage sensing means is in the voltage energized state.

17. The system according to claim 16 wherein the circuit interruption element comprises a series combination of
  a third circuit switch, coupled with the voltage sensing means, which is
    (1) closed when the voltage sensing means is in the voltage deenergized state, and
    (2) open when the voltage sensing means is in the voltage energized state; and
  b. a parallel combination of
    (1) a fourth circuit switch, coupled with the voltage sensing means, which is
      (a) closed when the voltage sensing means is in the voltage deenergized state, and
      (b) open when the voltage sensing means is in the voltage energized state, and
    (2) a PTC device.

18. The system according to claim 16 wherein
  a. the current sensing means comprises a current sensing relay coil; and
  b. the first circuit switch comprises a first set of contacts coupled with the current sensing relay coil.

19. The system according to claim 16 wherein
  a. the voltage sensing means comprises a voltage sensing relay coil;
  b. the second circuit switch comprises a first set of contacts coupled with the voltage sensing relay coil; and
  c. the third circuit switch comprises a second set of contacts coupled with the voltage sensing relay coil.

* * * * *